(12) United States Patent
Leathlean

(10) Patent No.: US 10,302,120 B2
(45) Date of Patent: May 28, 2019

(54) FIXTURE CONNECTION DEVICE

(71) Applicant: Barn Light Electric Company, LLC, Titusville, FL (US)

(72) Inventor: Mark Lee Leathlean, Titusville, FL (US)

(73) Assignee: Barn Light Electric Company, LLC, Titusville, FL (US)

( * ) Notice: Subject to any disclaimer, the term of this patent is extended or adjusted under 35 U.S.C. 154(b) by 0 days.

(21) Appl. No.: 15/386,710

(22) Filed: Dec. 21, 2016

(65) Prior Publication Data

US 2017/0175793 A1 Jun. 22, 2017

Related U.S. Application Data

(60) Provisional application No. 62/270,299, filed on Dec. 21, 2015.

(51) Int. Cl.
  *F16B 23/00* (2006.01)
  *F16B 35/00* (2006.01)

(52) U.S. Cl.
  CPC .................................. *F16B 35/005* (2013.01)

(58) Field of Classification Search
  CPC ...................................................... F16B 37/005
  USPC .... 411/397, 551, 395, 396, 417, 366.1, 195, 411/295, 412; 362/368, 406; 403/2
  See application file for complete search history.

(56) References Cited

U.S. PATENT DOCUMENTS

| 1,297,781 | A |   | 3/1919  | Beardslee |              |
|-----------|---|---|---------|-----------|--------------|
| 1,320,902 | A |   | 11/1919 | Newton    |              |
| 1,882,312 | A |   | 10/1932 | Sayer     |              |
| 2,111,357 | A |   | 3/1938  | Cornell, Jr. |           |
| 2,293,924 | A |   | 8/1942  | Swanson   |              |
| 2,347,651 | A | * | 5/1944  | Washam, Jr. | ........... B21B 27/08 |
|           |   |   |         |           | 285/121.7    |
| 2,376,279 | A | * | 5/1945  | Schlenkert | ................ E04B 9/20 |
|           |   |   |         |           | 206/343      |
| 2,435,678 | A |   | 2/1948  | Goebel    |              |
| 2,917,620 | A |   | 12/1959 | Arras     |              |
| 3,136,367 | A | * | 6/1964  | Wright    | .................... E21B 17/06 |
|           |   |   |         |           | 166/124      |
| 3,168,988 | A |   | 2/1965  | Kula      |              |
| 3,561,719 | A |   | 2/1971  | Grindle   |              |
| 3,912,918 | A |   | 10/1975 | Feinbloom |              |
| 4,436,468 | A | * | 3/1984  | Ozaki     | .................... B62K 21/06 |
|           |   |   |         |           | 280/279      |

(Continued)

FOREIGN PATENT DOCUMENTS

JP        H09-027211        1/1997

OTHER PUBLICATIONS

Petition for Inter Partes Review of U.S. Pat. No. 9,234,651 (Paper 2), *Barn Light Electric Company, LLC v. Jeffrey Ohai*, IPR2017-00145 (PTAB, petition filed Nov. 18, 2016).

(Continued)

*Primary Examiner* — Gary W Estremsky

(74) *Attorney, Agent, or Firm* — Stephen J. Leahu; Brinks Gilson & Lione

(57) ABSTRACT

A fixture connection assembly includes separate connection and threaded stem components. The threaded stem component includes both threaded and non-threaded portions, where the threaded stem may be re-sized and still produce useful fitted stems from discarded portions.

13 Claims, 16 Drawing Sheets

(56) References Cited

U.S. PATENT DOCUMENTS

| | | | | |
|---|---|---|---|---|
| 4,491,348 | A | * | 1/1985 | Thelen ................. F16L 27/103 285/234 |
| 4,541,038 | A | | 9/1985 | Van Noord |
| 4,799,714 | A | * | 1/1989 | Collet ..................... E21B 33/04 285/123.11 |
| 4,863,201 | A | * | 9/1989 | Carstens ............. F16L 37/0841 251/149.6 |
| 5,122,942 | A | | 6/1992 | Lee |
| 5,404,286 | A | | 4/1995 | Boutges |
| 5,454,674 | A | * | 10/1995 | Eriksson ................. F16B 39/02 411/295 |
| 5,584,559 | A | | 12/1996 | Toda |
| 5,741,103 | A | * | 4/1998 | Lee ......................... B60B 21/00 137/223 |
| 6,106,031 | A | * | 8/2000 | Guginsky ............. F16L 21/002 285/151.1 |
| 6,301,727 | B1 | * | 10/2001 | Bertrand ................. E03C 1/042 137/359 |
| 6,332,619 | B1 | * | 12/2001 | DeRosa ................ B23B 31/107 279/103 |
| 6,547,413 | B2 | | 4/2003 | Hung |
| 7,028,961 | B1 | * | 4/2006 | Dittmer ................. F16M 11/04 248/278.1 |
| 7,311,425 | B2 | * | 12/2007 | Jervey, III ................ F21S 8/06 362/391 |
| 7,837,508 | B1 | | 11/2010 | Switzer |
| 8,556,477 | B2 | | 10/2013 | Ohai |
| 8,708,374 | B1 | * | 4/2014 | Smith ................. H02G 3/0683 285/150.1 |
| 9,234,651 | B2 | | 1/2016 | Ohai |
| 9,958,141 | B2 | | 5/2018 | Ohai |
| 2004/0046385 | A1 | * | 3/2004 | Shemtov ................. F16L 25/08 285/139.1 |
| 2004/0165394 | A1 | | 8/2004 | Pusch |
| 2008/0223473 | A1 | | 9/2008 | Palmer |

OTHER PUBLICATIONS

Institution Decision for Inter Partes Review of U.S. Pat. No. 9,234,651 (Paper 9), *Barn Light Electric Company, LLC v. Jeffrey Ohai*, IPR2017-00145 (PTAB, decision issued May 25, 2017).

Wheeler Reflector Co. Catalog No. 50 (Exhibit 1004 for Inter Partes Review of U.S. Pat. No. 9,234,651, *Barn Light Electric Company, LLC v. Jeffrey Ohai*, IPR2017-00145, PTAB exhibit filed Nov. 18, 2016).

* cited by examiner

FIXTURE CONNECTION DEVICE

CROSS REFERENCE TO RELATED APPLICATION

This application claims benefit to U.S. Provisional Patent Application No. 62/270,299, filed on Dec. 21, 2015, the entirety of which is hereby incorporated by reference herein.

FIELD OF THE DISCLOSURE

This disclosure relates generally to light fixtures and more particularly to selectively sizable light fixture connection assemblies.

BACKGROUND

Light fixture connection devices, such as nipples and couplers, are generally known to facilitate the construction and mounting of a light fixture assembly. Light fixture connection devices may be used to connect a light fixture mounting base to a light fixture light canopy, on the one end, and to a light fixture, on the other end. Light fixture connection devices may further be used to extend such connections, for instance, to increase the distance or clearance from the light fixture mounting base to the light fixture. These types of connection devices may comprise threaded tubes that are hollow such that electrical conduit or wire may be extended through the hollow tube to reach the light fixture. Nuts or washers may be employed to affix, fasten, or otherwise to tighten the connection device to the mounting base and the light fixture.

Conventional light fixture connection devices are generally manufactured and offered for sale in various predetermined lengths, each sized to a length for a specific light fixture assembly or installation scenario. During installation of a light fixture, it may be desirable to use such connection devices that are set in length. However, there are also instances where having the option to adjust the length of the connection device is desirable. Differences from one light emitting device (e.g., light bulb) style to another often result in light fixture sizes and measurements being non-uniform or off from intended uses; in such situations, a recommended connection device, or even a connection device included with the light fixture hardware, may not fit properly as intended.

Some connection devices have attempted to address this sizing issue by using a mount or connection device having multiple threaded segments, each of which can be independently removed such that the connection device may be modified to a desired length. In that regard, FIG. 1 illustrates such a light fixture mounting post that has been long known in the art. As illustrated in FIG. 1, a long light fixture mounting post 100 generally comprises an integral or integrated flange 103 interposed between, and separating, a lower threaded portion 101 (configured to attach to a light fixture) and an upper threaded portion 102 (configured to attach to a light fixture shade, support bracket, or other structure). Typically, the lower threaded portion 101 includes a plurality of threaded segments 104 and a plurality of unthreaded segments 105 interposed between and separating adjacent threaded segments 104. Often, unthreaded segments 105 are generally constructed or machined in such a manner as to make it easier to cut, to break off, or to cleave lower portion 101 at unthreaded segments 105 than it is to cut or otherwise to break lower portion 101 at other locations along its length. In practice, lower portion 101 may be cut, broken, shorn, cleaved, or otherwise separated (at a selected unthreaded segment 105) so as to adjust a length of mounting post 100 to accommodate a specific light fixture installation.

The mounting post 100 implementation illustrated in FIG. 1 is constructed as a single-piece, though providing a variable length structure in some respects, which results in significant material waste and attendant costs. For example, when lower portion 101 is cut, threaded segments 104 that are below the cut (i.e., on the opposite side of unthreaded segment 105 at which the cut is made from integral flange 103) are discarded. Since these threaded segments 104 have been separated from the structure incorporating integral flange 103, such removed or separated threaded segments 104 have lost all utility as a suitable mounting structure in accordance with the prior art methodologies—they are unused, represent material waste, and may have deleterious effects on the environment, work force efficiency, operational profits, and so forth. In addition, if lower portion 101 is erroneously or inadvertently cut too close to flange 103, the entire structure of mounting post 100, including upper threaded portion 102 and flange 103, is rendered waste.

Accordingly, a single-piece mounting post 100 having attached or integrated tightening mechanisms or support structures such as flange 103 can often create more problems that it solves—it generates wastes and introduces inefficiencies into an installation process.

Features of the present disclosure overcome the foregoing and various other deficiencies of the prior art, providing selectively sizable light fixture connection assemblies that substantially eliminate wasted materials.

DETAILED DESCRIPTION

Figure 1:
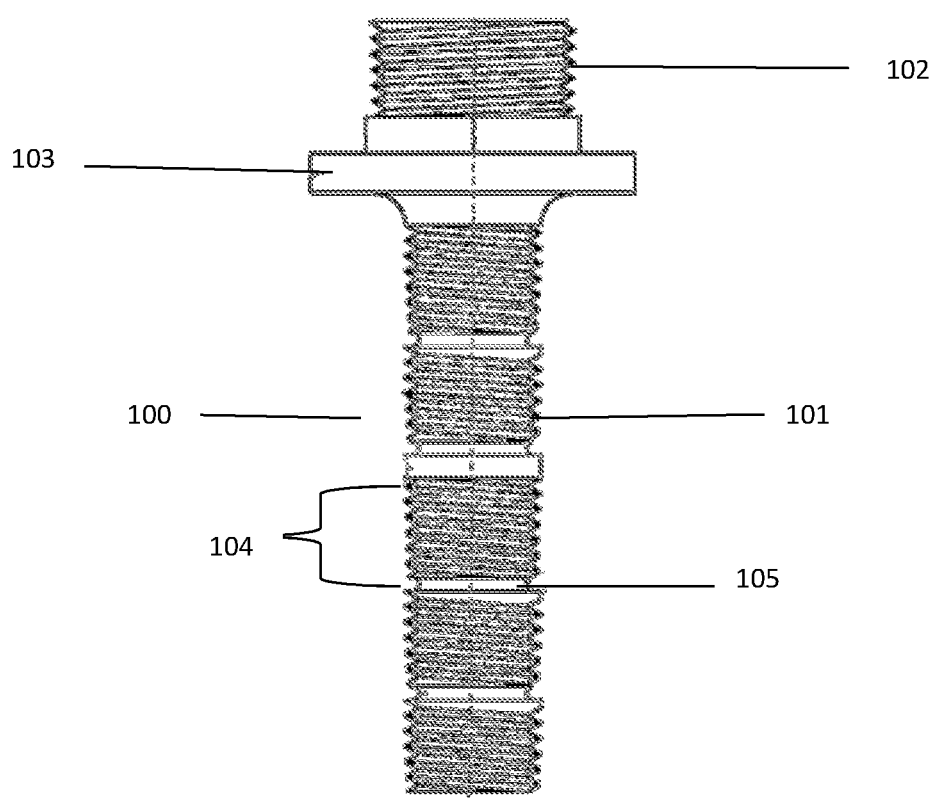
FIG. 1 illustrates a single-piece light fixture mounting post.

The following detailed description and the appended drawing figures describe and illustrate features, structural characteristics, or operational characteristics of certain embodiments for the purpose of enabling one of ordinary skill in the relevant art to understand the disclosure. As such, the detailed description and figures are purely representative in nature and are not intended to limit the scope of the features described herein. It should also be understood that the drawing figures may not be to scale and in certain instances details may have been omitted, which are not necessary for an understanding of the disclosed embodiments. In the accompanying drawing figures, like numerals generally represent like components.

FIGS. 2-9 illustrate a light fixture connection assembly including a threaded, male, stem for threaded engagement with a female portion of a coupler having interior threads. A screw may further secure the threaded stem to the coupler. The threaded stem may be selectively sized (e.g., cut) to a predetermined length corresponding with the desired spacing between a light fixture and a mounting structure. Then the selectively sized threaded stem may be threaded into the female portion of the coupler. Once the stem is threaded, a set screw may be inserted or threaded into a lateral passageway of the coupler and tightened, thereby further securing the threaded stem to the coupler and preventing rotational or axial dislodgement of the threaded stem while the threaded stem is within the coupler.

Figure 2A:
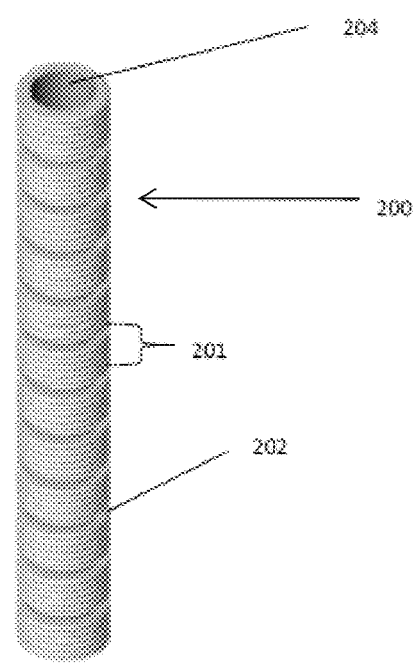
FIG. 2A is a perspective view of a threaded stem.
Figure 2B:
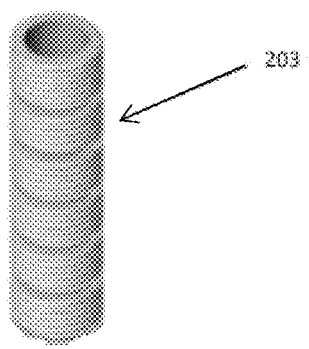
FIG. 2B is a perspective view of a threaded stem that has been selectively sized.
Figure 2C:
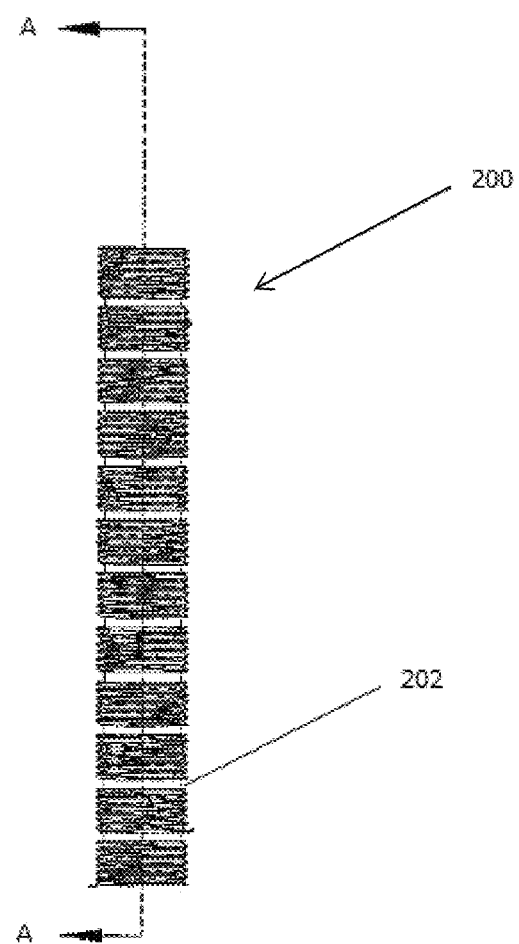
FIG. 2C is a side view of a threaded stem.

With reference now to FIGS. 2A, 2B, and 2C, it is noted that FIG. 2A is a perspective view of a threaded stem 200, FIG. 2C is a side view of the threaded stem 200, and FIG. 2B is a perspective view of a fitted stem 203 that also includes threaded portions and which has been selectively sized from the threaded stem 200, in accordance with embodiments of a light fixture connection assembly. The threaded stem 200 is generally configured to mount, attach, couple, or otherwise affix to a light fixture, on the one end, and to a light fixture shade, mounting bracket, or other ancillary or supporting structure, on the other end, via threads on the threaded stem 200. The threaded stem 200 may have utility in mounting various other apparatus or appliances that are not light fixtures, and that the disclosed embodiments (even when described with respect to use with a light fixture context) are susceptible of numerous applications beyond lighting to any applicable electrically powered component.

Figure 2D:
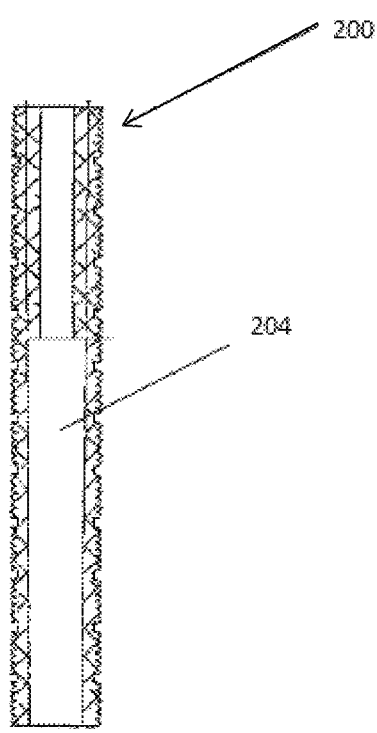
FIG. 2D is a longitudinal cross-section view of the threaded stem illustrated in FIG. 2B taken along line A-A.

FIG. 2A illustrates the threaded stem 200 including a hollow core, or bore 204, to accommodate electrical wires or other electrical conduits to reach a light emitting device of the light fixture. The bore 204 may accommodate the electrical wires or other electrical conduits such that electric power may be transmitted through the bore 204 via the electrical wires or other electrical conduits from a mounting base, or from a wall, ceiling, or other structure to which the mounting base is attached or affixed, to a light fixture or other device mounted on the threaded stem 200 for emitting light as set forth below. In some embodiments, the bore 204 has a constant diameter for the length of the threaded stem 200; however, as illustrated in FIG. 2D, the threaded stem 200 may have one or more section where the diameter of the bore is reduced at non-threaded portions of the threaded stem 200.

The threaded stem 200 may be comprised of a plurality of threaded segments 201 and a plurality of unthreaded segments 202 interposed between consecutive threaded segments 201. In practice, the threaded stem 200 may be cut (e.g., using hack saw, band saw, chop saw, or the like), or otherwise excised (e.g., broken off), at any of the unthreaded segments 202 which are generally easier to cut, or otherwise excise, than other locations along a longitudinal axis (A) of the threaded stem 200 due to the reduced thickness at the unthreaded segments 202 compared to the threaded segments 201. Various machining techniques, materials selection, or a combination of these and/or other methodologies may be employed to facilitate selective weakening of the threaded stem 200 at the unthreaded segments 202 without otherwise compromising the structural integrity of the threaded stem 200 as a whole. In the foregoing manner, the threaded stem 200 may be selectively sized resulting in, for example, one or more fitted stems 203 (e.g., illustrated in FIG. 2B) that are smaller than the threaded stem and may be used as nipples, posts, couplers, collars, or other connector portions in a light fixture or other electrical appliance assembly. The fitted stem 203, or the threaded stem 200 from which the fitted stem 203 has been broken off from, may be selectively sized to have a specific length for a specific component in a light fixture or other assembly, resulting in a suitable fit while reducing, minimizing, or eliminating wasted materials. Further, the selective sizing of the threaded stem 200 can also take into account the desired bore 204 diameter(s) when utilizing the threaded stem 200 with sections of varying bore diameters, as illustrated in FIG. 2D. This way, the fitted stem 203 may be broken off from the larger threaded stem 200 and still have a useful purpose as nipples, posts, couplers, collars, or other connector portions in a light fixture or other electrical appliance assembly.

Figure 3A:
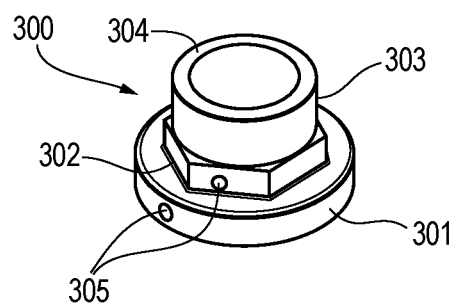
FIG. 3A is a perspective view of a connector component.
Figure 3B:
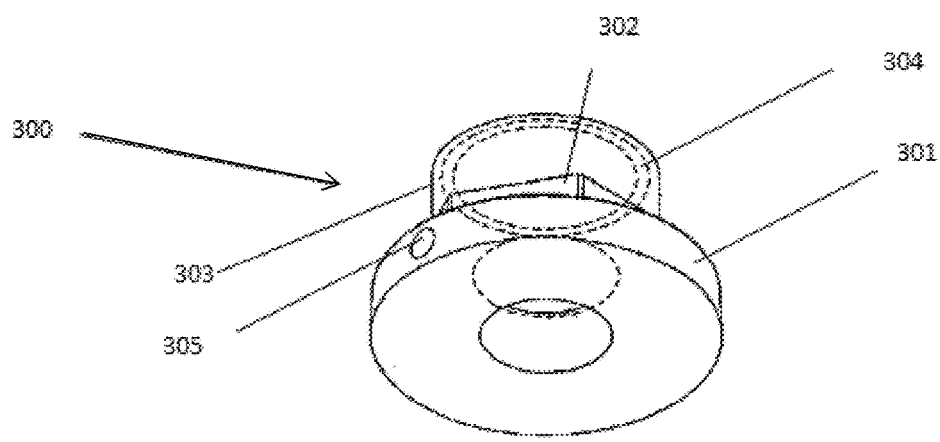
FIG. 3B is a bottom perspective view of a connector component.
Figure 4:
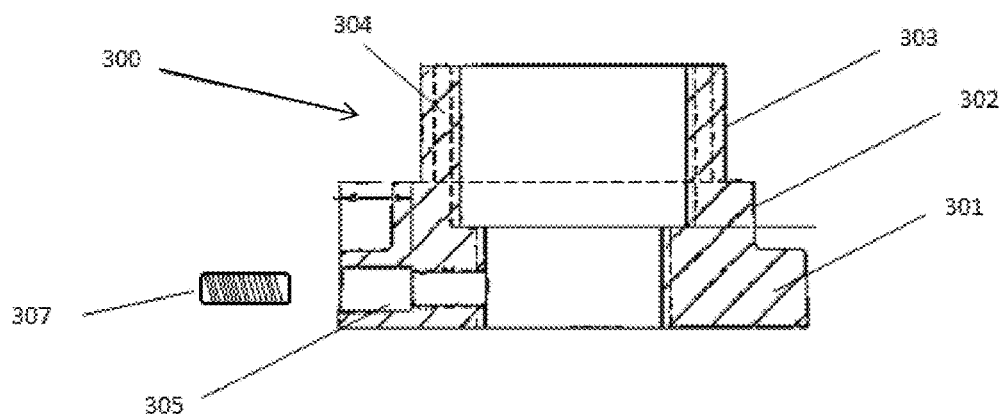
FIG. 4 is a longitudinal cross-section view of a connector component.
Figure 5:
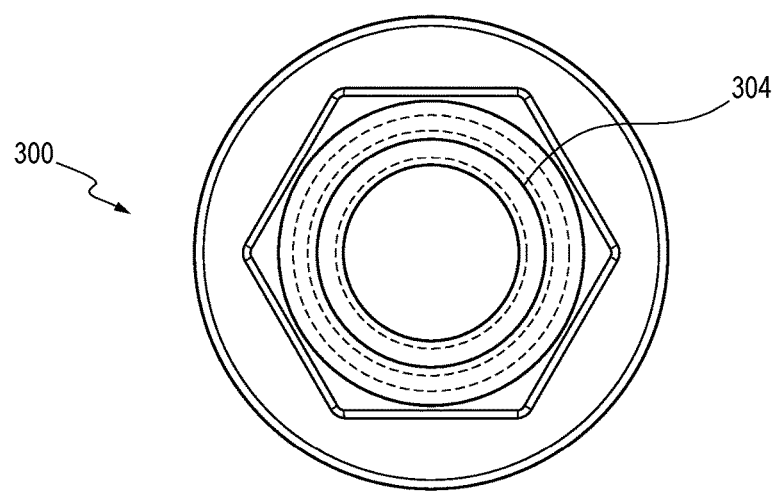
FIG. 5 is a top view of a connector component.
Figure 6:
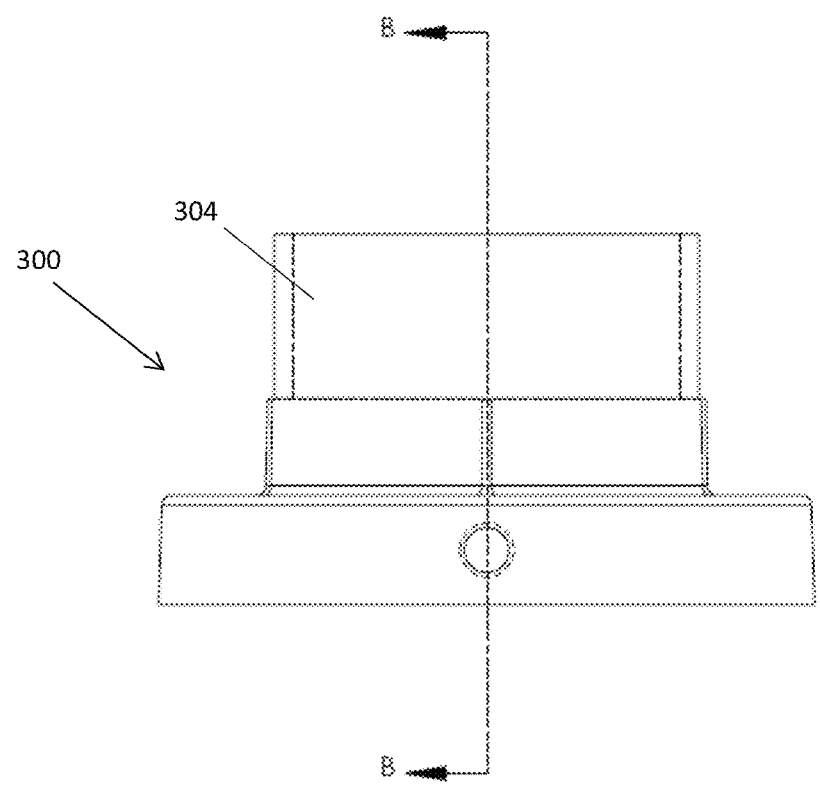
FIG. 6 is a side view of a connector component.
Figure 7:
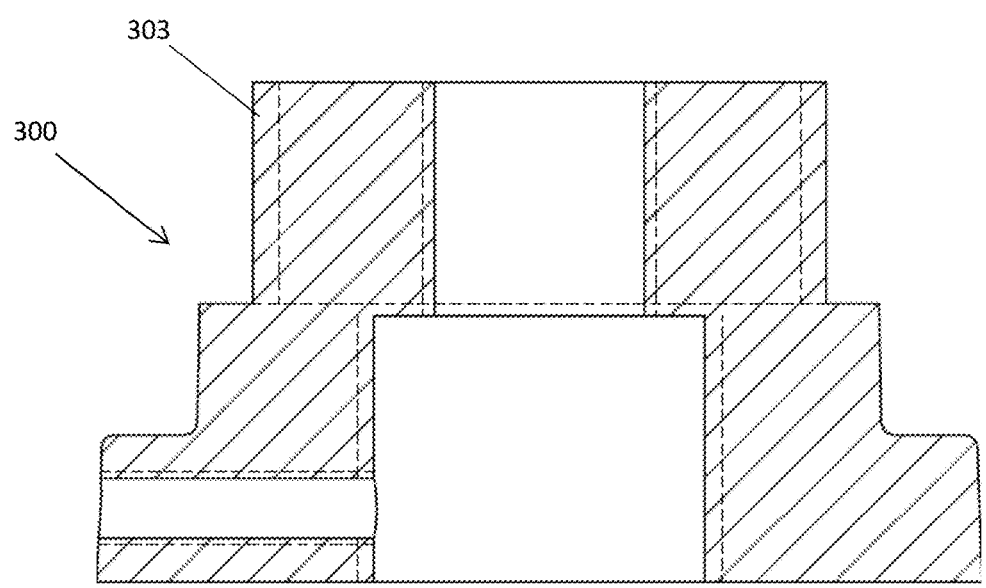
FIG. 7 is a longitudinal cross-section view of the connector component illustrated in FIG. 6 taken along line B-B.

FIGS. 3A, 3B, 4, 5, and 6 show various views of a connector component in accordance with an embodiment of a connection assembly. FIG. 3A and FIG. 3B are perspective views of a connector 300, FIG. 4 is a longitudinal cross-section view of the connector 300, FIG. 5 is a top view of the connector 300, and FIG. 6 is a side view of the connector 300, in accordance with an embodiment of a connection assembly. The connector 300 comprises a bottom ring 301, a nut 302, and a shoulder 303. As with stem 200, connector 300 may be hollow along a longitudinal axis line B-B, i.e., having a longitudinal bore accommodating electrical conduit (e.g., as illustrated in FIG. 6 and FIG. 7).

Figure 8:
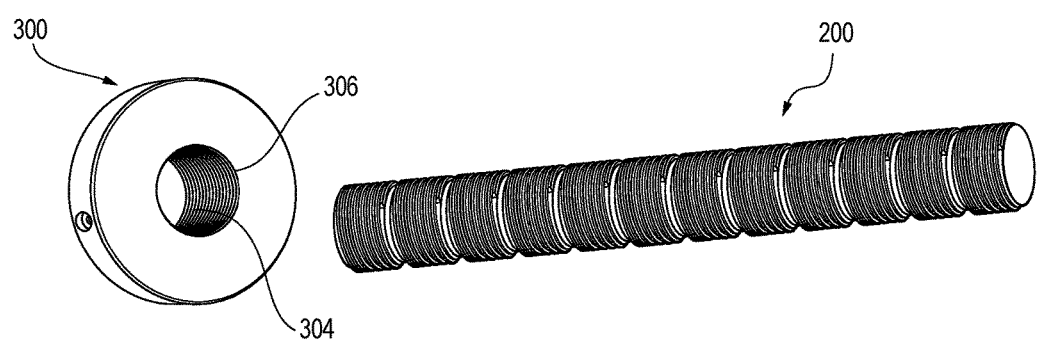
FIG. 8 is a perspective view of a threaded stem and a connector component.
Figure 9:
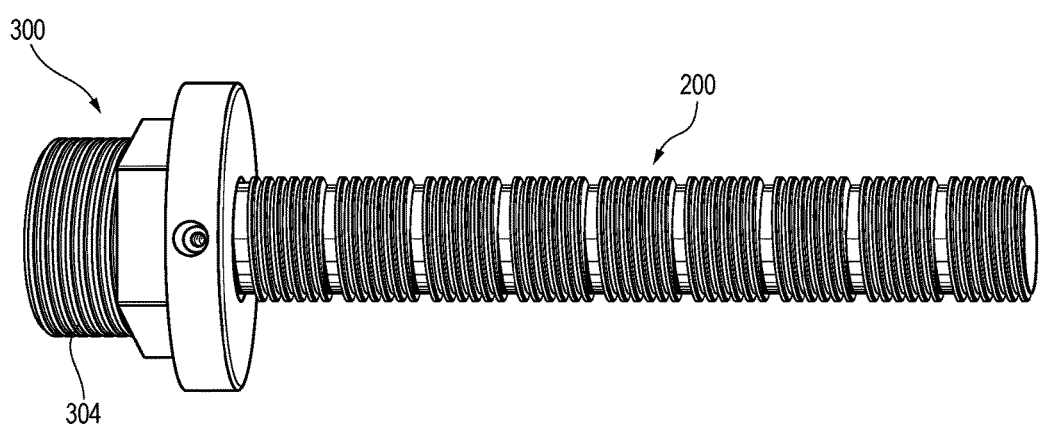
FIG. 9 is a perspective view of a threaded stem and a connector component in engagement.

An internal portion of shoulder 303 may be embodied in or comprise a threaded segment 304, for facilitating threaded engagement or attachment to a mounting base, canopy, or other structure as necessary or desired for a particular mounting application. In that regard, a nut 302 may be suitably sized and shaped to be engaged by a wrench, socket driver, pliers, or other torsional tool to effectuate such threaded engagement. Various platform shapes, such as hexagons, pentagons, squares, and so forth, are generally known in the art and would be suitable for the nut 302. In some embodiments, the threaded segment 304 of the shoulder 303 may comprise an internally threaded segment (as illustrated in FIGS. 3B, 4 and 8). In some embodiments, the threaded segment 304 of the shoulder 303 may comprise an externally threaded segment (as illustrated in FIG. 9).

In yet another embodiment, the threaded segment 304 of the shoulder 303 may comprise both an externally threaded segment and an internally threaded segment. The externally threaded may be used with a mating coupler (e.g., hex coupler) that sandwiches a gasket and the threaded segment 304 between them. The internally threaded segment may be used for mounting purposes, for example, where a stem, gooseneck, cord connector or other mounting components are attached.

The various embodiments of the threaded segment 304 (internal threads, external threads, mixture of internal and external threads) provides versatility for the connector 300 to be utilized to provide an attachment feature in a wide variety of different applications such as different mounting bases, canopies, or other structure as necessary or desired for a particular mounting application. In one embodiment, a bottom ring 301, the nut 302, or both may include or comprise a tapped hole 305. A set screw 307 or similar locking mechanism may be inserted or threadedly screwed through tapped hole 305 to secure the connector 300 to the threaded stem 200 and to prevent relative annular motion of these components relative to each other. Additionally or alternatively, the connector 300 may be similarly rigidly affixed, such as via the set screw 307, for example, to a mounting base, canopy, or other structural element that is threadedly engaged with the threaded segment 304 as set forth above.

In use, the connector 300 may be suitably sized and configured to fit over an end of the threaded stem 200 or the fitted stem 203. In one embodiment, this may be a slip-fit engagement, for instance, in which an internal surface of connector component 300 is not threaded or is otherwise not configured operatively to engage threads on the threaded stem 200 or the fitted stem 203. The slip-fit embodiment has the advantage of minimizing manufacturing costs of the connector 300, as it is not necessary to machine internal threads in the longitudinal bore of the connector 300. In such an embodiment, as noted above, a pin or set screw 307 (illustrated in FIG. 4), for instance, may be inserted in tapped hole 305 to secure or otherwise rigidly to affix the structural elements, preventing relative movement (annular, longitudinal, or both) of the connector 300 and the threaded stem 200 or the fitted stem 203.

In addition or alternatively, the connector 300 may be constructed, for example with internal threads 306 in the longitudinal bore (as illustrated in FIG. 8), and intended to threadedly engage the threaded stem 200 or the fitted stem 203. Even in such an embodiment, it may be desirable to employ the set screw 307 or other locking mechanism as described above with a slip fit arrangement. The internal thread 306 may be a ½-14 NPS thread, or other thread type that matches the threads of the threaded stem 200. The internally threaded segment of the threaded segment 304 may be configured to match the threads of a connection mounting component.

Upon operative engagement with the threaded stem 200 or the fitted stem 203 as set forth above and illustrated in FIG. 9, the connector 300 may be used as a post or a nipple in a light fixture assembly to attach to mounting bases, canopies, shades, or other structures, such as at the threaded segment 304. By offering the threaded stem 200 and connector 300 as separate pieces, there are more opportunities for adjustability (fine tuning) within the fixture as it relates to positioning a light source that hangs from 200. Another benefit is that by having separate threaded stem 200 and connector 300 pieces, waste is minimized and inventory may be better balanced.

With respect to a particular installation process or application, any unused portion of the fitted stem 203 may be repurposed to be employed in other, subsequent light fixture or other appliance installations in cooperation with a suitable connector 300, for instance, or as a load bearing attachment or structural element. The fitted stem 203 may be cut or selectively resized further in a similar manner as described above with specific reference to the threaded stem 200 and FIGS. 2A and 2B.

In some circumstances, it may be desirable to use straight threads, as opposed to tapered threads, for example, for load bearing attachments, including in connection with light fixture assemblies or other appliance installation applications. Many light fixture assemblies also include couplers or other extension structures to add additional length from a mounting base or shade to a light fixture; such couplers may connect directly with extension rods or links, sometimes via straight threads, but not always. In any event, where the thread pattern on the threaded stem 200 and the fitted stem 203 are selected in accordance with a standard or industry conventions, for example, any unused fitted stems 203 may also be used as, or in cooperation with, couplers that connect rods or links to extend a length of a light fixture or elements associated with its installation.

Re-purposing the threaded stem 200 and the fitted stems 203 as set forth above may reduce or minimize waste and costs attendant therewith. By implementing the connector 300 as a separate discrete part or structural element in an appliance connection assembly, rather than integrating such structure with the threaded stem 200, for instance, one errant or inadvertent cut of the threaded stem 200 does not render the entire structural useless. Instead of discarding mistakenly cut threaded stems 200 and unused fitted stems 203 (creating material and environmental waste), the two-piece connection assembly approach set forth above returns even poorly-sized threaded stems 200 back into an installation process as fitted stems 203, which then may be used either independently or in conjunction with a connector 300 as necessary or desired in accordance with application-specific requirements.

As illustrated in FIG. 7, in some embodiments, the internal portion of shoulder 303 may have a diameter of the longitudinal bore that is smaller than the diameter of the portion of the connector 300 that engages the threaded stem 200 and the fitted stem 203 (compared to the embodiment illustrated in FIG. 4, where the internal portion of shoulder 303 may have a diameter of the longitudinal bore that is larger than the diameter of the portion of the connector 300 that engages the threaded stem 200 and the fitted stems 203).

Figure 10:
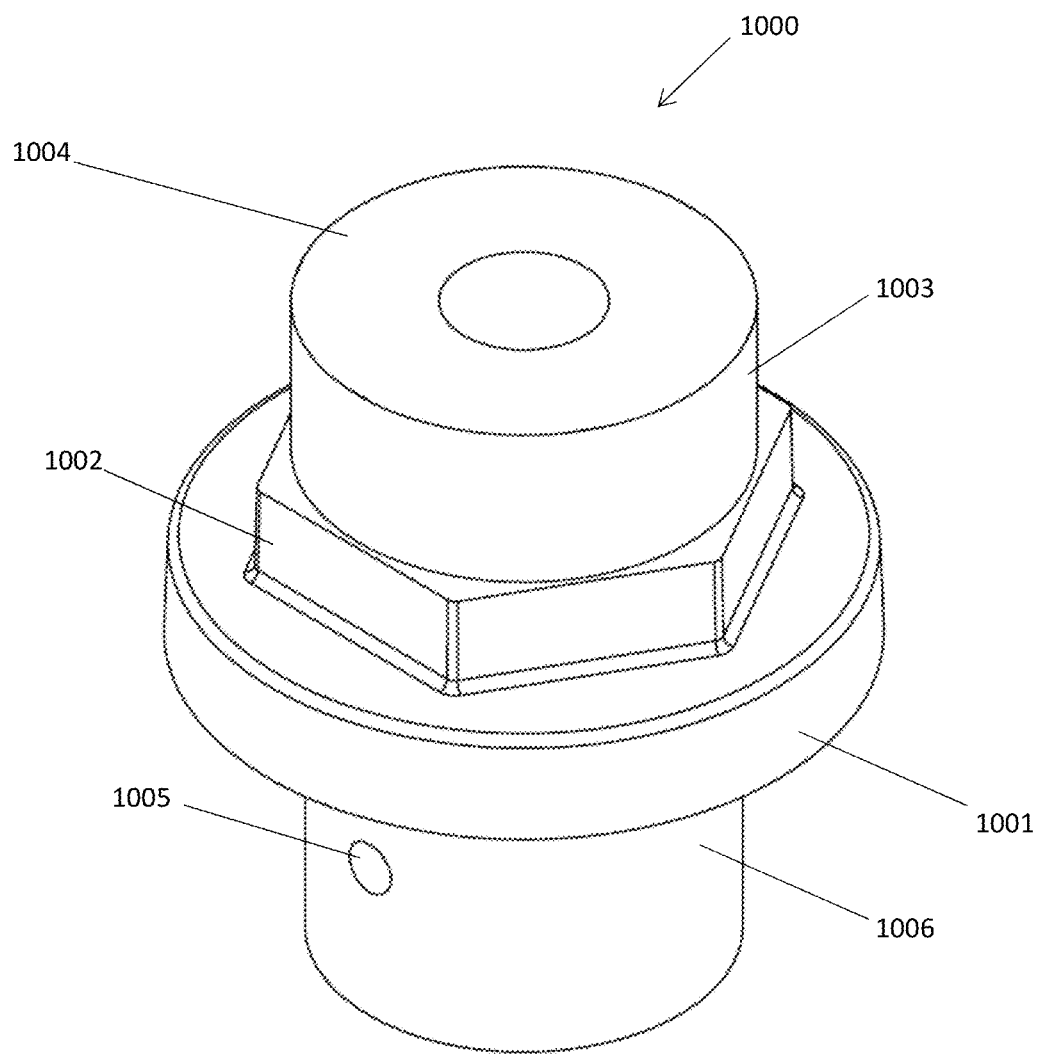
FIG. 10 is a perspective view of an alternative connector component.
Figure 11:
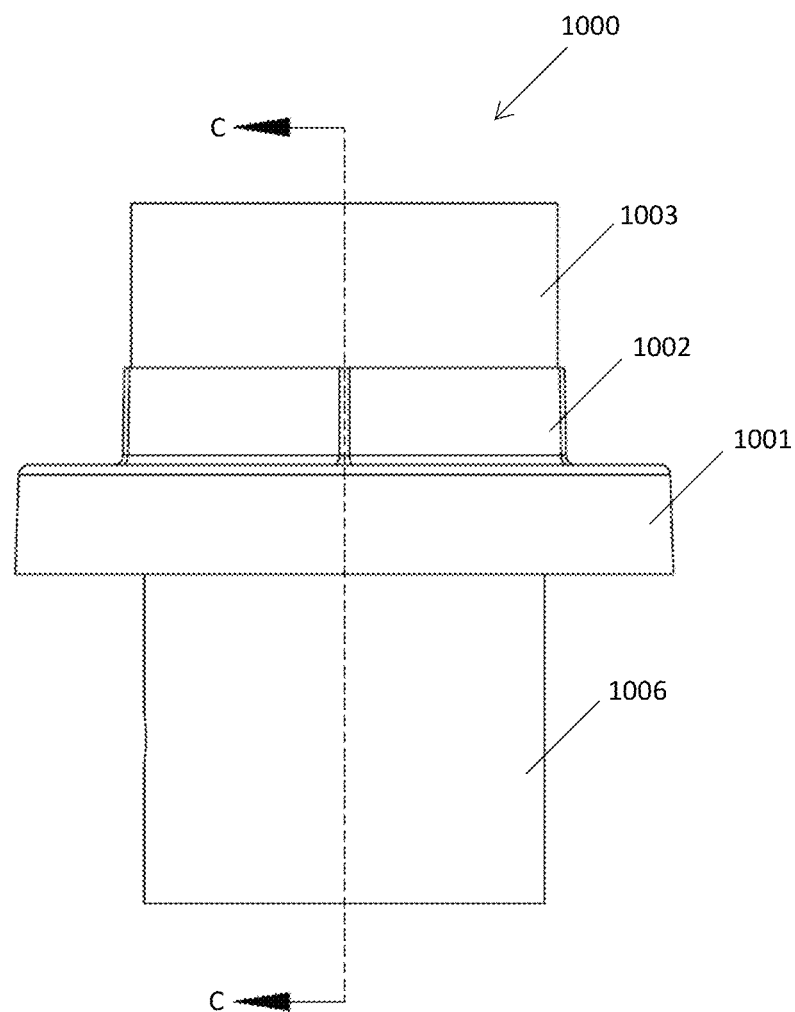
FIG. 11 is a side view of the alternative connector component.
Figure 12:
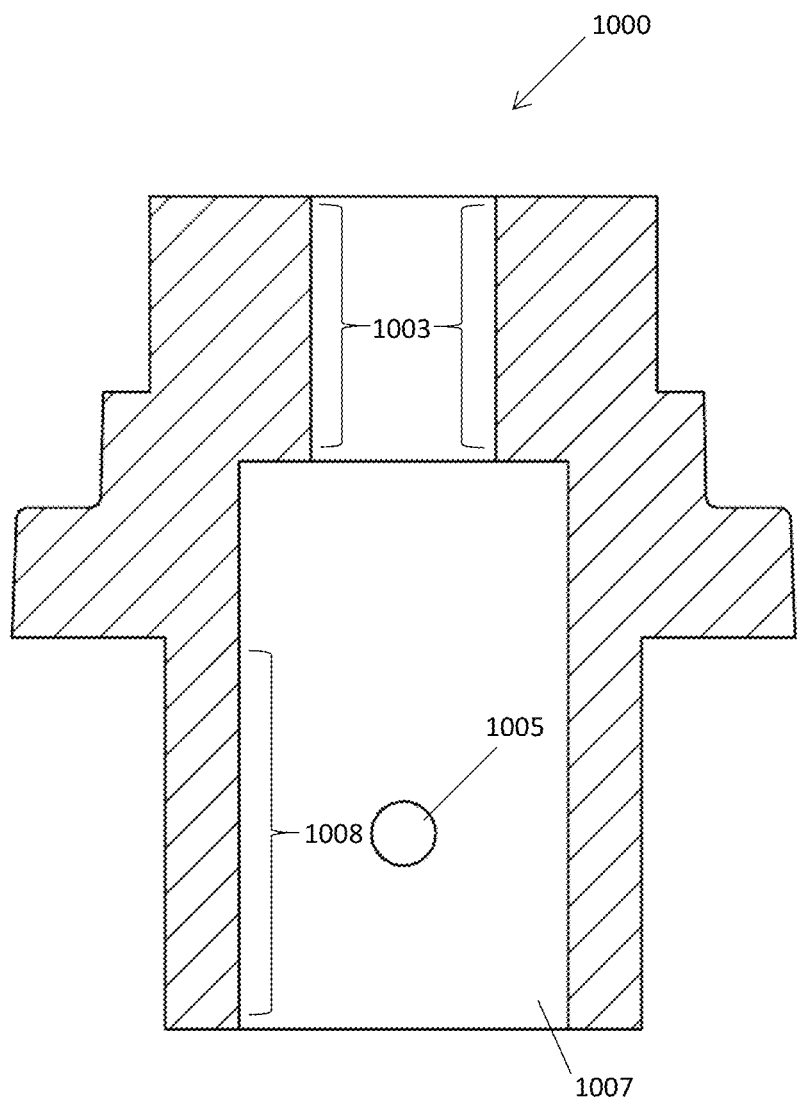
FIG. 12 is a longitudinal cross-section view of the alternative connector component illustrated in FIG. 10 taken along line C-C.

FIG. 10 illustrates an alternative connector 1000 that includes a base portion 1006 not included in the connector 300. The alternative connector 1000 also includes a bottom ring 1001, a nut 1002, and a shoulder 1003. The alternative connector 1000 may be hollow along a longitudinal axis line C-C, i.e., having a longitudinal bore accommodating electrical conduit (e.g., as illustrated in FIG. 11 and FIG. 12). An internal portion of shoulder 1003 may be embodied in or comprise a threaded segment 1004, for facilitating threaded engagement or attachment to a mounting base, canopy, or other structure as necessary or desired for a particular mounting application. FIG. 11 illustrates a side view of the alternative connector 1000. The longer base portion 1006 in the alternative connector 1000 that allows for increased adjustability of the stem 200 that is threaded into the hollow cavity 1007 within the alternative connector 1000. The threaded characteristics of the hollow cavity 1007 may be the same, or similar, to the threaded characteristics of the hollow cavity within connector 300. For example, the alternative connector 1000 may be comprised of internal threads within the shoulder 1003 portion of the hollow cavity 1007, for facilitating threaded engagement or attachment to a mounting base, canopy, or other structure as necessary or desired for a particular mounting application, when the threaded segment 1004 is comprised of an interior threaded segment. The threaded segment 1004 may further refer to external threaded segments on the exterior of the shoulder 1003. In addition or alternatively, the alternative connector 1000 may be constructed, for example with internal threads 1008 in the longer base portion 1006 (as illustrated in FIG. 12), and intended to threadedly engage the threaded stem 200 or the fitted stem 203. As illustrated in FIGS. 10 and 12, the longer base portion 1006 may include a tapped hole 1005.

The descriptions set forth above are meant to be illustrative and not limiting. Various modifications of the disclosed embodiments, in addition to those described herein, will be apparent to those skilled in the art from the foregoing description. Such modifications are also intended to fall within the scope of the concepts described herein. The disclosures of each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the disclosed technologies and techniques in many other ways, using equivalents and alternatives that do not depart from the scope of the present disclosure. It is thus intended that the embodiments disclosed in the specification be considered as illustrative or representative only, with a true scope and spirit of the features described in this disclosure being indicated by the following claims.

What is claimed is:

1. A connection assembly comprising:
a threaded stem; and
a connector configured to engage the threaded stem, the connector having a longitudinal bore, wherein the connector comprises:
a bottom ring having a tapped hole configured to receive a set screw for engaging the threaded stem;
a nut formed adjacent to the bottom ring, wherein a diameter of the nut is less than a diameter of the bottom ring;
a shoulder formed adjacent to the nut and including an external threaded segment, wherein a diameter of the shoulder is less than a diameter of the nut, the external threaded segment comprising an external surface of the shoulder; and, an internal threaded segment traversing the longitudinal bore, the internal threaded segment having a single-thread diameter, the longitudinal bore traversing an entire axial length of the connector.

2. The connection assembly of claim 1, wherein the threaded stem includes a hollow bore.

3. The connection assembly of claim 1, wherein the tapped hole includes internal threads for threadedly receiving the set screw.

4. The connection assembly of claim 1, wherein the tapped hole includes a slip-fit hole without internal threads.

5. The connection assembly of claim 1, wherein the connector is configured to engage a fitted stem, wherein the fitted stem is a shorter portion of the threaded stem.

6. The connection assembly of claim 1, wherein the threaded stem includes straight threads.

7. The connection assembly of claim 1, wherein the threaded stem includes tapered threads.

8. The connection assembly of claim 1, wherein the connector further comprises: a base formed adjacent to the bottom ring.

9. The connection assembly of claim 1, wherein the nut comprises:
a second tapped hole configured to receive a set screw for engaging the threaded stem through the second tapped hole.

10. A connection assembly comprising:
a threaded stem, wherein the threaded stem include a plurality of threaded segments and non-threaded segments interposed between the plurality of threaded segments; and
a connector configured to engage the threaded stem, the connector having a longitudinal bore, wherein the connector comprises:
a bottom ring having a tapped hole configured to receive a set screw for engaging the threaded stem;
a nut formed adjacent to the bottom ring, wherein a diameter of the nut is less than a diameter of the bottom ring;
a shoulder formed adjacent to the nut and including an external threaded segment, wherein a diameter of the shoulder is less than a diameter of the nut, the external threaded segment comprising an external surface of the shoulder; and,
an internal threaded segment traversing the longitudinal bore, the internal threaded segment having a single-thread diameter.

11. A connection assembly comprising:
a threaded stem; and
a connector configured to engage the threaded stem, the connector having a longitudinal bore, wherein the connector comprises:
a bottom ring having a tapped hole configured to receive a set screw for engaging the threaded stem;
a nut formed adjacent to the bottom ring, wherein a diameter of the nut is less than a diameter of the bottom ring, wherein the nut is shaped as one of a hexagon, pentagon, or square;
a shoulder formed adjacent to the nut and including an external threaded segment, wherein a diameter of the shoulder is less than a diameter of the nut, the external threaded segment comprising an external surface of the shoulder; and,
an internal threaded segment traversing the longitudinal bore, the internal threaded segment having a single-thread diameter.

12. A connection assembly comprising:
a threaded stem, wherein the threaded stem includes a plurality of threaded segments and non-threaded segments interposed between the plurality of threaded segments, wherein the non-threaded segments have a smaller diameter than the threaded segments; and
a connector configured to engage the threaded stem, the connector having a longitudinal bore, wherein the connector comprises:
a bottom ring having a tapped hole configured to receive a set screw for engaging the threaded stem;
a nut formed adjacent to the bottom ring, wherein a diameter of the nut is less than a diameter of the bottom ring;
a shoulder formed adjacent to the nut and including an external threaded segment, wherein a diameter of the shoulder is less than a diameter of the nut, the external threaded segment comprising an external surface of the shoulder; and,
an internal threaded segment traversing the longitudinal bore, the internal threaded segment having a single-thread diameter.

13. A connection assembly comprising:
a threaded stem; and
a connector configured to engage the threaded stem, the connector having a longitudinal bore, wherein the connector comprises:

a bottom ring;
a base formed adjacent to the bottom ring, the base comprising a tapped hole configured to receive a set screw for engaging the threaded stem through the tapped hole;
a nut formed adjacent to the bottom ring, wherein a diameter of the nut is less than a diameter of the bottom ring;
a shoulder formed adjacent to the nut and including an external threaded segment, wherein a diameter of the shoulder is less than a diameter of the nut, the external threaded segment comprising an external surface of the shoulder; and,
an internal threaded segment traversing the longitudinal bore, the internal threaded segment having a single-thread diameter, the longitudinal bore traversing an entire axial length of the connector.

* * * * *